(12) United States Patent
Poupon et al.

(10) Patent No.: US 10,053,761 B2
(45) Date of Patent: Aug. 21, 2018

(54) METHOD FOR TREATMENT OF TWO SURFACES OF TWO METAL PARTS

(71) Applicant: Airbus Operations (SAS), Toulouse (FR)

(72) Inventors: Cedric Poupon, Colomiers (FR); Pierre Heberle, Plaisance du Touch (FR)

(73) Assignee: AIRBUS OPERATIONS SAS, Toulouse (FR)

(*) Notice: Subject to any disclaimer, the term of this patent is extended or adjusted under 35 U.S.C. 154(b) by 742 days.

(21) Appl. No.: 14/566,429

(22) Filed: Dec. 10, 2014

(65) Prior Publication Data
US 2015/0167142 A1 Jun. 18, 2015

(30) Foreign Application Priority Data

Dec. 16, 2013 (FR) .................................. 13 62647

(51) Int. Cl.
C23C 4/12 (2016.01)
B32B 37/00 (2006.01)
(Continued)

(52) U.S. Cl.
CPC .............. C23C 4/127 (2013.01); B32B 37/00 (2013.01); B32B 38/0008 (2013.01); B32B 38/0036 (2013.01); B64F 5/10 (2017.01); C23C 4/02 (2013.01); C23C 4/08 (2013.01); C23C 4/12 (2013.01); C23C 4/134 (2016.01); C23C 4/18 (2013.01); C23C 24/04 (2013.01);
(Continued)

(58) Field of Classification Search
None
See application file for complete search history.

(56) References Cited

U.S. PATENT DOCUMENTS 3,883,411 A * 5/1975 Gendron ................... C25C 1/08
  204/281
4,646,480 A * 3/1987 Williams ................ B24C 3/065
  451/102
(Continued)

FOREIGN PATENT DOCUMENTS

CA 2772838 9/2013
EP 2206804 7/2010
(Continued)

OTHER PUBLICATIONS

French Search Report, dated Sep. 30, 2014.

Primary Examiner — Nathan T Leong
(74) Attorney, Agent, or Firm — Greer, Burns & Crain, Ltd.

(57) ABSTRACT

A method for treatment of two surfaces, each surface belonging to a metal part which is designed to be painted, the two surfaces being secured adjacent to one another or one on top of the other. The treatment method comprising a sandblasting step during which each surface is subjected to sandblasting, a projection step during which each surface thus sandblasted is subjected to thermal projection of an aluminum alloy, such as to compensate for the divergences between the two surfaces, and a finishing step during which the layer of aluminum alloy thus projected is subjected to mechanical finishing, such as to constitute a coating with a homogeneous surface.

12 Claims, 1 Drawing Sheet

(51) Int. Cl.
*B32B 38/00* (2006.01)
*C23C 4/02* (2006.01)
*C23C 4/08* (2016.01)
*C23C 4/18* (2006.01)
*C23C 24/04* (2006.01)
*C23C 4/134* (2016.01)
*B64F 5/10* (2017.01)

(52) U.S. Cl.
CPC ....... *B32B 2311/24* (2013.01); *B32B 2605/18* (2013.01); *Y10T 428/12736* (2015.01)

(56) References Cited

U.S. PATENT DOCUMENTS

| | | | |
|---|---|---|---|
| 6,273,016 B1 * | 8/2001 | Gibbs | B63B 21/00 |
| | | | 114/230.1 |
| 2007/0194085 A1 | 8/2007 | Spinella et al. | |
| 2007/0241164 A1 * | 10/2007 | Barnes | B23K 20/1225 |
| | | | 228/101 |
| 2010/0170937 A1 | 7/2010 | Calla | |
| 2013/0316120 A1 | 11/2013 | Anderson et al. | |

FOREIGN PATENT DOCUMENTS

| | | |
|---|---|---|
| EP | 2666715 | 11/2013 |
| GB | 431067 | 7/1935 |
| WO | 2007082210 | 7/2007 |

\* cited by examiner

METHOD FOR TREATMENT OF TWO SURFACES OF TWO METAL PARTS

CROSS-REFERENCES TO RELATED APPLICATIONS

This application claims the benefit of the French patent application No. 1362647 filed on Dec. 16, 2013, the entire disclosures of which are incorporated herein by way of reference.

BACKGROUND OF THE INVENTION

The present invention relates to a method for treatment of two surfaces of two metal parts which are designed to be painted, an assembly of two metal parts which have been subjected to a surface treatment method of this type, as well as an aircraft comprising at least two such metal parts.

In an aircraft, the metal parts, and in particular the exterior metal parts, are generally covered with a film of paint. However, the staying power of the paint on this part can become fragile as the result of poor adhesion of the paint on the surface of the part.

Problems of this type occur, for example, on the heads of rivets, or around a fastening when a quantity of mastic which is insufficient to fill a hollow has been put into place.

In such cases, the film of paint tends to break up at these fragile points, which detracts from the appearance of the part, and can give rise to corrosion of the parts which are no longer covered by the paint.

SUMMARY OF THE INVENTION

An objective of the present invention is to provide a method for treatment of two surfaces of two metal parts designed to be painted, which does not have the disadvantages of the prior art, and in particular which makes it possible to compensate for the divergences between the two parts, for better adhesion of the film of paint which will then be applied.

For this purpose, a method for treatment of two surfaces is proposed, each surface belonging to a metal part which is designed to be painted, the two surfaces being secured adjacent to one another or one on top of the other, the treatment method comprising:
  a sandblasting step during which each surface to be treated is subjected to sandblasting;
  a projection step during which each surface thus sandblasted is subjected to thermal projection of an aluminum alloy, such as to compensate for the divergences between the two surfaces; and
  a finishing step during which the layer of aluminum alloy thus projected is subjected to mechanical finishing, such as to constitute a coating with a homogeneous surface.

A surface treatment method of this type makes it possible to obtain a coating with a regular composition and texture which is favorable for the staying power of a paint applied subsequently.

BRIEF DESCRIPTION OF THE DRAWINGS

The aforementioned characteristics of the invention, as well as others, will become more apparent by reading the following description of an embodiment, the said description being provided in relation with the appended drawings, in which.

DETAILED DESCRIPTION OF THE PREFERRED EMBODIMENTS

Figure 1:
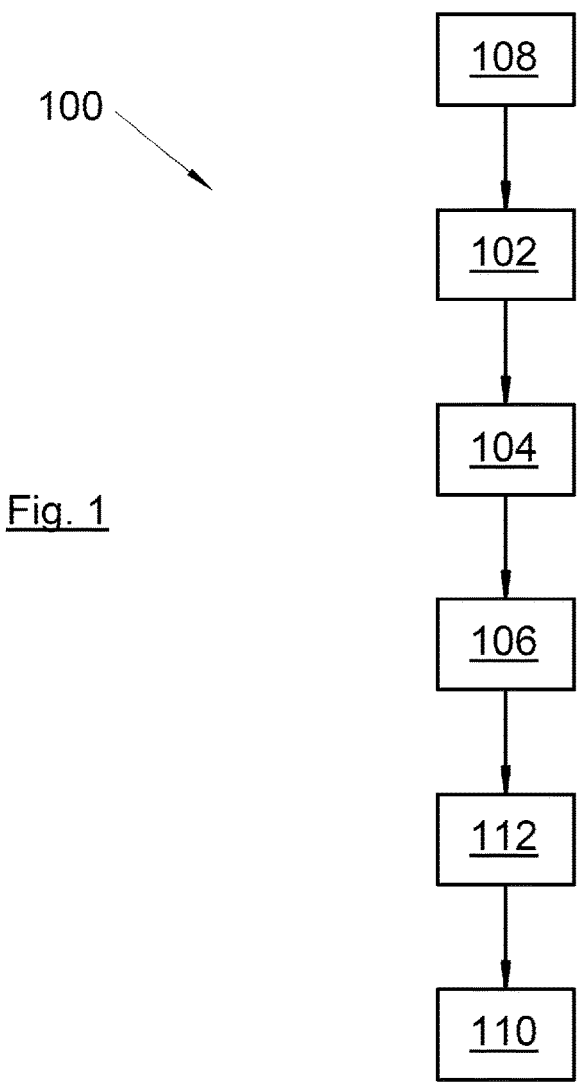
FIG. 1 is a view illustrating the steps of a surface treatment method according to the invention.

FIG. 1 represents a method for treatment of surfaces 100 of two surfaces to be treated. Each surface belongs to a metal part which is designed to be painted. Each metal part consists for example of an alloy based on aluminum or titanium. The surface treatment method 100 comprises:
  a sandblasting step 102 during which each surface to be treated is subjected to sandblasting;
  a projection step 104 during which each surface thus sandblasted is subjected to thermal projection of an aluminum alloy; and
  a finishing step 106 during which the layer of aluminum alloy thus projected is subjected to mechanical finishing.

The layer of aluminum alloy thus deposited and finished makes it possible to obtain a regular surface of a surface coating which has a homogenous composition and texture on each surface treated, by means of compensation for the divergences between the two surfaces, by filling the hollows around the fastenings as well as the aerodynamic seals, and thus assisting the staying power of paint applied subsequently.

The sandblasting step 102, the projection step 104 and the finishing step 106 are carried out on part of the two surfaces, but preferably on all of the two surfaces, such as to obtain a surface coating with a homogenous composition on all of the two surfaces.

When the two surfaces are covered with a layer of aluminum alloy, the finishing step 106 can be followed by a painting step 110, during which paint is applied on the finished layer of aluminum alloy.

In order to improve the staying power of the paint on each surface covered by the finished layer of aluminum alloy, the treatment method 100 comprises, between the finishing step 106 and the painting step 110, an application step 112 during which a hydride coating, comprising an organo-metallic component, of the sol-gel type, is applied on the finished layer of aluminum alloy. The organo-metallic component creates covalent bonds with the finished layer of aluminum alloy, and organic bonds with the paint applied subsequently during the step of application of the paint.

The two parts 200a-b form an assembly, the two surfaces of which, secured adjacent to one another or one on top of the other, have been subjected to the surface treatment method 100.

An aircraft has a skin which can be produced by assembling at least two metal parts 200a-b, the surfaces of which are secured adjacent to one another at a junction area by means of fastening means of the rivet type, and have been subjected to the surface treatment method 100.

The skin of the aircraft can also be produced by assembling at least two metal parts 200a-b, the surfaces of which are secured one on top of the other at a junction area by means of fastening means of the rivet type, and have been subjected to the surface treatment method 100.

The treatment method 100 is preferably carried out on all of the skin of the aircraft, in order to obtain a homogenous surface coating on all of the skin.

The treatment method 100 makes it possible to cover the junction area regularly with the aluminum alloy projected, in order to ensure the impermeability of the junction area by means of elimination of the spaces between the two metal parts 200a-b, and by smoothing of the aerodynamic joints. This junction area covers the area where the two parts 200a-b overlap, or are in contact with one another, and the areas where the fastening means are disposed.

Figure 2:
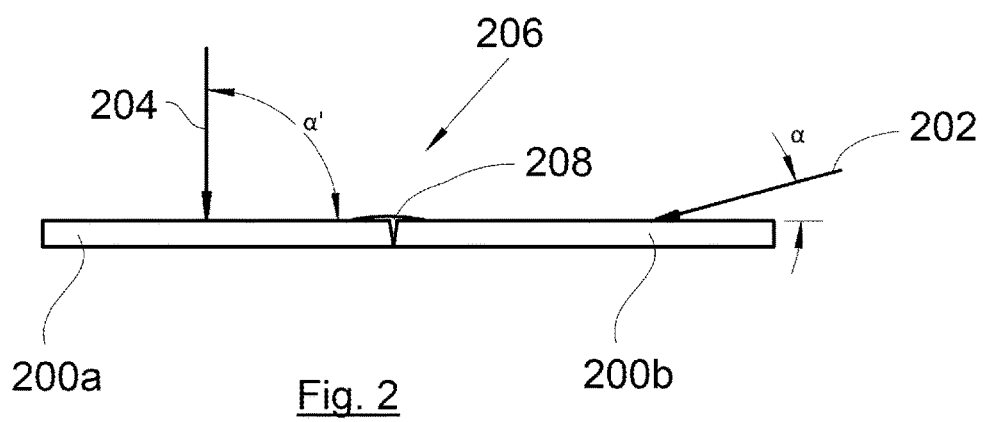
FIG. 2 is a schematic representation of two parts being subjected to certain steps of the treatment method according to the invention.

FIG. 2 shows two metal parts 200a-b which are secured adjacent to one another, and in particular are made of aluminum or titanium alloy, and more particularly are aircraft parts, the surfaces of which at the junction area 206 have been treated in accordance with the surface treatment method 100 according to the invention.

The reference 208 shows the layer of aluminum alloy which is projected in order to compensate for the divergences between the two metal parts 200a-b. In FIG. 2, the spread of the layer of aluminum alloy is limited, but preferably the spread covers all of the parts 200a-b.

The sandblasting step 102 corresponds more particularly to a sandblasting step using a fine mesh, smaller than 120 (125 µm), which comprises projection at high speed of fine particles of silica $SiO_2$ or alumina $Al_2O_3$ with a diameter smaller than 150 µm, against the surface to be treated.

The projection carried out during the sandblasting step 102 can be carried out with an angle of attack α of approximately 5° to 25° relative to the surface to be treated, in order to assist cutting. The arrow 202 which has an angle of approximately 5° to 25° relative to the surface to be treated represents the direction of projection of the particles.

The projection carried out during the sandblasting step 102 can be carried out with an angle of attack α' of approximately 90° relative to the surface to be treated, in order to assist the bombarding effect and thus break up the oxides. The arrow 204 which has an angle of approximately 90° relative to the surface to be treated represents the direction of projection of the particles.

The projection step 104 comprises, for example, of thermal projection by means of a plasma torch, or thermal projection at a lower temperature (of the cold spray type). The projection step 104 permits the creation of a dense layer of aluminum alloy 208. The aluminum alloy is deposited in several layers on the surface of the parts 200a-b.

The thermal projection technique (plasma or cold spray) makes it possible to obtain a dense layer of aluminum alloy which adheres to the metal materials of the aluminum alloy or titanium alloy type.

According to a particular embodiment, the aluminum alloy which is projected during the projection step 104 has a composition which is greater than 60% by weight of aluminum, and preferably greater than 95% by weight of aluminum.

According to a particular embodiment, the aluminum alloy which is projected during the projection step 104 has a level of porosity lower than 10% and a level of oxide lower than 5%, and preferably a level of porosity lower than 1% and a level of oxide lower than 0.5%.

According to a particular embodiment, the aluminum alloy which is projected during the projection step 104 has a thickness which varies from 10 µm to 5 mm, according to the irregularities of the surface of the metal part 200a-b to be treated.

After the finishing step 106, the treatment method 100 makes it possible to obtain homogeneousness of the surface state, the maximum divergence of form of which does not exceed 0.5 mm, and preferably 0.1 mm, and even more preferably 0.02 mm.

The finishing step 106 comprises, for example, polishing or mechanized sanding of the surface to be treated. The finishing step 106 makes it possible to smooth the surface of the layer of aluminum alloy 208, and to obtain an appearance without local heterogeneity.

Prior to the sandblasting step 102, the surface treatment method 100 can comprise a pickling step 108, during which the surfaces to be treated of the parts 200a-b are subjected to laser pickling in order to remove any organic elements.

The above-described surface treatment method 100 can be applied equally well locally on some of the parts 200a-b, or on all of the parts 200a-b of an aircraft.

The surface treatment method 100 also makes it possible to eliminate the anodic oxidations caused by humidity, which are very restrictive from the point of view of safety and the environment, and to eliminate the basic primer which contains hexavalent chrome, with these methods being implemented before the decorative painting of the aircraft is carried out. The surface treatment method 100 is thus a dry surface treatment which is particularly advantageous from the point of view of safety and the environment, and thus makes it possible to produce painted parts which are free from hexavalent or trivalent chrome.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for treatment of two surfaces, each surface belonging to a metal part which is to be painted, the two surfaces being secured adjacent to one another or one on top of the other, the treatment method comprising:
   a sandblasting step during which each surface is subjected to sandblasting;
   a projection step during which each surface thus sandblasted is subjected to thermal projection of an aluminum alloy, to compensate for the divergences between the two surfaces;
   a finishing step during which the layer of aluminum alloy thus projected is subjected to mechanical finishing, to constitute a coating with a homogeneous surface; and
   a painting step following the finishing step, during which paint is applied on the finished layer of aluminum alloy,
   wherein prior to the sandblasting step, the method comprises a pickling step, during which the surface to be treated is subjected to laser pickling.

2. A method for treatment according to claim 1, wherein the sandblasting step, the projection step and the finishing step are carried out on all of the two surfaces, to obtain a surface coating which is homogeneous on all of the two surfaces.

3. The method for treatment according to claim 1, wherein the sandblasting step corresponds to a fine sandblasting step, using a mesh no larger than 120.

4. The method for treatment according to claim 1, wherein the sandblasting step comprises projection of particles at an angle of attack of approximately 5° to 25° relative to the surface to be treated.

5. The method for treatment according to claim 1, wherein the sandblasting step comprises projection of particles at to an angle of attack of approximately 90° relative to the surface to be treated.

6. The method for treatment according to claim 1, wherein the method comprises, between the finishing step and the painting step, an application step during which a hydride coating, comprising an organo-metallic component of a sol-gel type, is applied on the finished layer of aluminum alloy.

7. A method for treatment of two surfaces, each surface belonging to a metal part which is to be painted, the two surfaces being secured adjacent to one another or one on top of the other, the treatment method comprising:
- a sandblasting step during which each surface is subjected to sandblasting;
- a projection step during which each surface thus sandblasted is subjected to thermal projection of an aluminum alloy, to compensate for the divergences between the two surfaces;
- a finishing step during which the layer of aluminum alloy thus projected is subjected to mechanical finishing, to constitute a coating with a homogeneous surface; and
- a painting step following the finishing step, during which paint is applied on the finished layer of aluminum alloy, wherein the sandblasting step, the projection step and the finishing step are carried out on all of the two surfaces, to obtain a surface coating which is homogeneous on all of the two surfaces.

8. The method for treatment according to claim 7, wherein the sandblasting step corresponds to a fine sandblasting step, using a mesh no larger than 120.

9. The method for treatment according to claim 7, wherein the sandblasting step comprises projection of particles at an angle of attack of approximately 5° to 25° relative to the surface to be treated.

10. The method for treatment according to claim 7, wherein the sandblasting step comprises projection of particles at to an angle of attack of approximately 90° relative to the surface to be treated.

11. The method for treatment according to claim 7, wherein the method comprises, between the finishing step and the painting step, an application step during which a hydride coating, comprising an organo-metallic component of a sol-gel type, is applied on the finished layer of aluminum alloy.

12. A method for treatment of two surfaces, each surface belonging to a metal part which is to be painted, the two surfaces being secured adjacent to one another or one on top of the other, the treatment method comprising:
- a sandblasting step during which each surface is subjected to sandblasting;
- a projection step during which each surface thus sandblasted is subjected to thermal projection of an aluminum alloy, to compensate for the divergences between the two surfaces;
- a finishing step during which the layer of aluminum alloy thus projected is subjected to mechanical finishing, to constitute a coating with a homogeneous surface; and
- a painting step following the finishing step, during which paint is applied on the finished layer of aluminum alloy, wherein the method comprises, between the finishing step and the painting step, an application step during which a hydride coating, comprising an organo-metallic component of a sol-gel type, is applied on the finished layer of aluminum alloy.

* * * * *